United States Patent Office 3,280,067
Patented Oct. 18, 1966

3,280,067
PLASTICIZED HALOGEN-CONTAINING RESINS
Constantine E. Anagnostopoulos, Charleston, W. Va., assignor to Monsanto Company, a corporation of Delaware
No Drawing. Filed Mar. 9, 1962, Ser. No. 178,542
6 Claims. (Cl. 260—31.6)

This application is a continuation-in-part of copending application Serial Number 100,026, filed April 3, 1961, now abandoned.

This invention relates to new and useful compositions comprising halogen-containing vinyl resins and relates more particularly to compositions comprising halogen-containing vinyl resins plasticized with fumarate ester compositions. The invention has special utility for the producton of halogen-containing vinyl resin plastisols, organosols and dry blends wherein the esters of fumaric acid function effectively as polymerizable plasticizers which significantly improve certain physical properties of the starting resin.

Halogen-containing vinyl resins such as polyvinyl chloride and its coplymers, which are widely employed in the plastics industry, are generaly hard and brittle in their unplasticized state. Although unplasticized polyvinyl chloride has an indefinite flexibility point of approximately 75° to 80° C., the unplasticized resins do not become fused, fluid, pliable, mobile or workable up to temperatures of 165-175° C. Moreover because of the fact that these polyvinyl resins do not have definite fusion points and do not become fluid at temperatures below their decomposition temperatures, the unplasticized resins cannot be processed by wet-milling, extruding or molding, and particularly, these materials cannot be used for rotational casting techniques.

To overcome many of these difficulties it is common practice to intimately mix polyvinyl chloride resins with plasticizing compounds such as dioctyl phthalate and tricresyl phosphate. Such plasticized compositions are easily and readily worked on roll mills, and films and sheets formed therefrom are supple and flexible, these characteristics being desirable for many applications. Said compositions may also be readily molded or extruded, although the molded or extruded articles possess a softness, flexibility or non-rigidity which are undesirable in this type of article. In many applications it is desirable to use resin compositions prepared by conventional formulation methods, which upon fusion and curing result in hard and rigid finished articles.

It is an object of this invention to provide improved halogen-containing vinyl resin compositions.

A further object is to provide novel plastic compositions comprising halogen-containing resins and certain fumarate ester compositions.

A still further object of this invention is to provide new polymerizable plasticizers for vinyl chloride polymers and copolymers.

Another object is to provide new resin compositions which may be easily prepared by conventional formulation methods and which, upon fusion and curing, result in a hard, rigid material.

Further objects will be apparent to those skilled in the art from the following description and claims.

In accordance with this invention it has been found that a plastisol comprising a halogen-containing vinyl resin and, as a polymerizable plasticizer, a fumarate ester composition of the type hereinafter described, may be fused and cured to a hard and rigid material. The aforementioned plastisols are prepared in a well known manner by intimately mixing or stirring a finely divided resin with a novel polymerizable plasticizer, preferably in conjunction with a small amount of a peroxy polymerization catalyst until a smooth dispersion is obtained. This composition, upon molding and curing, results in a hard and rigid material.

Generally speaking, from about 5 to about 200 parts of plasticizer may be used for each 100 parts of halogen-containing vinyl resin. However, it is preferred to use from about 30 to about 70 parts of plasticizer per 100 parts of resin.

This invention is particularly applicable to polymerized vinyl chloride resins and to resins formed by the conjoint polymerization of vinyl chloride with other materials such as vinyl acetate, vinyl propionate, vinylidene chloride, methyl methacrylate or diethyl maleate, preferably wherein vinyl chloride comprises at least 70% of the copolymer resin.

In order to facilitate the curing of the polymerizable plasticizer in the resin dispersion within a practicable time, it is preferred to incorporate from about 0.5% to 5% of a polymerization catalyst, based on the weight of the polymerizable plasticizer. While any of the usual peroxy polymerization catalysts such as benzoyl peroxide, acetyl peroxide, and chlorine substituted aryl peroxides are effective, it is preferred to use t-butyl-perbenzoate or benzoyl peroxide.

The usual heat stabilizers and light stabilizers for the resin may also be present in the dispersion as indicated in the examples below. Fillers and coloring materials well known to those familiar with the art may also be added to the resin if desired.

The fumarate ester compositions which are useful as polymerizable plasticizers with this invention can comprise a mixture of a plurality of components. A common feature of such components is the fumaryl group. In general the fumarate ester compositions can be characterized by the following general formula

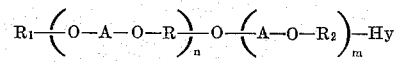

wherein
A is the fumaryl radical

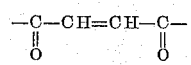

R is selected from the group consisting of adiphatic and alicyclic hydrocarbon radicals;
$R_1$ and $R_2$ are selected from the group consisting of alkyl, cycloalkyl, alkenyl and aralkyl radicals;
$n$ is a number from 0 to 2;
$m$ and $y$ are unlike numbers from 0 to 1; and
$m+n$ is at least 1.

The fumarate ester compositions characterized by the aforedescribed formula are prepared by any one of the following methods:

METHOD I

A partial ester of maleic acid, represented by the structure

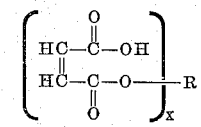

where R is selected from aliphatic and alicyclic hydrocarbon radicals and $x$ is a whole number from 2 to 6, is heated with at least one hydroxy compound of the structure $R_1OH$, where $R_1$ is selected from alkyl, cycloalkyl, alkenyl and aralkyl radicals in the presence of a halogen-containing compound to esterify and isomerize the maleic partial ester in a single, simple step. It is preferred to carry out the reaction at a temperature of from about 120 to about 150° C.

METHOD II

A fumarate ester represented by the formula

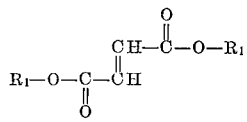

where $R_1$ is selected from alkyl, cycloalkyl, alkenyl and aralkyl radicals is reacted with a polyhydroxy compound having from 2 to 6 hydroxyl groups, wherein the moles of fumarate ester in the reaction is equal to the number of hydroxyl groups on the polyhydroxy compound. It is preferred to carry out the reaction at a temperature of from about 120 to about 160° C.

METHOD III

A fumarate ester heretofore described in Method II is reacted with a polyhydroxy compound having 2 to 6 hydroxyl groups, wherein one and one-half moles of fumarate ester is used in the reaction for each hydroxyl group on the polyhydroxy compound. It is preferred to carry out the reaction at a temperature of from about 120 to about 180° C.

METHOD IV

A fumaryl chloride of the formula

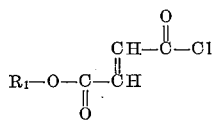

where $R_1$ is selected from alkyl, cycloalkyl, alkenyl and aralkyl radicals is reacted with a polyhydroxy compound having from 2 to 6 hydroxyl groups, the molar ratio of chloride to polyhydroxy compound being $x:1$ where $x$ equals the number of said hydroxyl groups. It is preferred to carry out the reaction at a temperature of from about 50 to about 120° C.

The components of the fumarate ester compositions prepared by the aforedescribed methods are believed to be represented by the following formulae wherein the variables have the significance noted heretofore.

The aliphatic polyhydroxy compound suitable for use in preparing the polymerizable fumarate ester compositions of this invention include alkylene glycols, as for example, ethylene glycol, 1,2-propanediol, 1,3-propanediol, 2-methyl-2-ethyl-1,3-propanediol, 1,2-butanediol, 1,3-butanediol, 1,4-butanediol, 2-butene-1,4-diol, 2,3-butanediol, 2,2-dimethylpropane-1,3-diol, 1,4-pentanediol, 1,5-pentanediol, 1,6-hexanediol, 1,10-decanediol, 1,12-octadecanediol, 9,10-octadecanediol and the like; polyalkylene glycols such as diethylene glycol, triethylene glycol, tetraethylene glycol, dipropylene glycol, tripropylene glycol and the like; triols such as glycerol, amylglycerol, diethylglycerol, 1,2,3-tributylglycerol, 1,2,6-hexanetriol, 1,3,5-hexanetriol and the like; other polyhydroxy compounds such as those which can be produced by condensation of formaldehyde with various ketones and aldehydes, as formaldehyde with acetaldehyde—pentaerythritol
with propionaldehyde—trimethylolethane
with butyraldehyde—trimethylolpropane
with valeraldehyde—trimethylolbutane
with acetone—1,1,1-trimethylolisopropanol
with methylethyl ketone—2,2-dimethylolbutanol-3 as well as compounds such as erythritol, xylitol, sorbitol, diglycerol, 2-hydroxymethyl-2-methylpropanediol-1,3 anhydroenneaheptitol; and the substituted glycols, such as halogenated glycols, e.g. 3-chloro-1,2-propanediol, 2-chloro-1,3-propanediol, 2-chloro-1,3-butanediol, or nitro substituted glycols, e.g. 2-nitro-1,3-propanediol, 2-nitro-1,3-butanediol, 2-nitro-2-methylpropanediol-1,3, trimethylol nitromethane, 2-nitro-1,4-butanediol, and the like.

Further examples of suitable polyhydroxy compounds are the alicyclic polyols such as 1,2-cyclohexanediol, 1,3-cyclohexanediol, 1,4-cyclohexanediol, 1,4-cyclohexanedimethylol, 1,3,5-cyclohexantrimethylol, 1,3,5-cyclohexanetriol, 1,3-cyclopentanediol, pentahydroxycyclohexane, hexahydroxycyclohexane, and the various bis(hydroxycyclohexyl)alkanes such as 2,2-bis(4-hydroxycyclohexyl) propane.

The alcohols, $R_1OH$, which are employed in preparing the polymerizable fumarate ester compositions for use in this invention, include methanol, ethanol, n-propanol, isopropanol, 1-butanol, 2-butanol, isobutanol, n-pentanol, isopentanol, n-hexanol, isohexanol, 4-methylpentanol-2 2-ethylbutanol-1, n-heptanol, 2-ethylhexanol, 1-octanol, 2-octanol, isooctanol, isononanol, n-decanol, isodecanol,

| Component | n | m | Approx. Wt. Percent in Composition | | | |
|---|---|---|---|---|---|---|
| | | | Method I | Method II | Method III | Method IV |
| $R_1$—O—A—O—R—O—H | 1 | 0 | 5–20 | 5–10 | | |
| $R_1$—O—A—O—$R_2$ | 0 | 1 | 35–40 | 30–35 | 2 | 2 |
| $R_1$—(O—A—O—R)$_n$—O—A—O—$R_2$ | 1 ≅ 1.7–2.0 | 1 | 45–50 | 58–63 | <5 | |
| $R_1$—O—A—O—R—O—A—O—$R_2$ | 1 | 1 | 1–5 | 1–2 | 93–95 | 98 |

1 Based on molecular weight determination.

As will be readily apparent, R represents a divalent radical in the illustrations given above. It should be recognized that where R is a higher polyvalent radical (from tri- to hexavalent), the several components of the fumarate ester compositions are of analogous nature. However, it should be noted that the presence of additional free valences on R produce structures of much greater complexity. In those applications in which fumarate ester compositions are desired where R is a trivalent radical or higher, it is preferred that said fumarate ester compositions be prepared by reacting a fumaryl chloride with a polyhydroxy compound having 3 to 6 hydroxyl groups (see Method IV).

n-dodecanol, tridecanol, tetradecanol, pentadecanol, octadecanol, carbitol, methyl carbitol, allyl alcohol, methallyl alcohol, crotyl alcohol, benzyl alcohol, phenylethyl alcohol, cyclopentanol, cyclohexanol, cyclooctanol, methylcyclohexanol, ethylcyclohexanol, dimethylcyclohexanol, cyclohexylmethanol, cyclohexylethanol, propylcyclohexanol, isopropylcyclohexanol, butylcyclohexanol, hexlycyclohexanol, octylcyclohexanol, nonylcyclohexanol, dodecyclohexanol and the like.

The exemplary alcohols listed above may be obtained from natural or synthetic sources. Thus, for example, the alcohols can be produced by the Oxo synthesis or can be derived from the Fischer-Tropsch process, the Synol process or the Oxyl process. Such alcohols can also be produced by the hydration of olefins, the oxidation of petroleum fractions or the catalytic hydrogenation of coconut oil.

The following detailed examples will more fully illustrate the preparation of the fumarate ester compositions which are useful as polymerizable plasticizers with this invention.

*Example 1*

Into a suitable reaction vessel (having agitation means, means for measuring the temperature of liquids and vapors, heating and cooling means, and means for condensing vapors) there was charged 270.1 grams (3.0 moles) of 1,3-butanediol and 590.2 grams (6.0 moles) of maleic anhydride and the resulting mixture was heated to about 120° C.–150° C. for several minutes, cooled and held at 120° C.–125° C. for one-half hour to yield 1,3-butylene glycol, bis(acid maleate). 489.7 grams (6.6 moles) of butanol, 2.2 grams of concentrated sulfuric acid and 21.4 grams of concentrated hydrochloric acid were then added and the resulting mixture was maintained warm enough to cause continuous refluxing of butanol for about five hours (this required temperatures of about 135° C.–140° C. and a slight vacuum towards the end of the reaction). Water formed by the esterification was removed via the butanol-water azeotrope and was separated before butanol was returned to reaction vessel.

Thereafter hydrogen chloride and excess butanol were removed by stripping under vacuum and a temperature of about 140° C. Sulfuric acid and any partial ester present were removed by washing the reaction mass with aqueous sodium carbonate, a basic filter aid material such as Microcel "C", a synthetic calcium silicate produced by a hydrothermal reaction of diatomaceous earth with a source of calcium, was added and the reaction mass was steamed for about 30 minutes at 100° C. and 100 mm. of mercury to remove residual butanol. The reaction product was then dried at 100° C. and 20–30 mm. of mercury for about 30 minutes and filtered (a filter aid can be used) to yield 1208.0 grams of a liquid fumarate ester composition having an index of refraction at 25° C. of 1.6818, a specific gravity at 25°/25° C. of 1.0608 and a color of 200 APHA.

*Example 2*

In the manner of Example 1, 376.8 grams (3.0 moles) of dipropylene glycol, 592.2 grams (6.0 moles) of maleic anhydride and 541.0 grams (7.3 moles) of butanol were utilized to prepare 1135.9 grams of a liquid fumarate ester composition having a specific gravity at 25°/25° C. of 1.0626 and an index of refraction at 25° C. of 1.4600.

*Example 3*

To a suitable reaction vessel there was charged 294.7 grams (3.0 moles) of maleic anhydride and 134.7 grams (1.0 mole) of 1,2,6-hexanetriol, and the resulting mixture was heated to about 200° C. for several minutes, cooled and held at 140°–145° C. for several hours. 296.7 grams (4.0 moles) of butanol, 1.8 grams of concentrated sulfuric acid and 10.7 grams of concentrated hydrochloric acid were then added to the reaction mass and the resulting mixture was maintained for about 1½ hours warm enough to cause continuous refluxing of butanol. Water formed by the esterification was removed by the butanol-water azeotrope and was separated before butanol was returned to the reaction vessel.

Thereafter, hydrogen chloride and excess butanol were removed by stripping under vacuum. Sulfuric acid and any partial ester present were removed by washing the reaction mass with hot aqueous sodium carbonate after which the reaction mass was steamed for about three hours at 110°–115° C. and 100 mm. of mercury. The reaction product obtained from the above was then dried to yield 578.3 grams of a liquid fumarate ester composition having an index of refraction, $n_d^{25}$, of 1.4688 and a specific gravity at 25°/25° C. of 1.0836.

*Examples 4–18*

In a manner similar to the procedure of Example 1, other compositions of esters of fumaric acid are prepared employing the reactants tabulated below:

| Example No. | Polyhydroxy Compound | Alcohol |
|---|---|---|
| 4 | Diethylene glycol | Butanol. |
| 5 | 1,3-butanediol | 2-ethylhexanol. |
| 6 | do | Methanol. |
| 7 | do | Isopentanol. |
| 8 | do | Isohexanol. |
| 9 | do | Isooctanol. |
| 10 | 1,2-propanediol | 2-ethylhexanol. |
| 11 | Ethylene glycol | Do. |
| 12 | Triethylene glycol | Propen-1-ol-3. |
| 13 | do | Propen-1-ol-3 and butanol. |
| 14 | Neopentyl glycol | Butanol. |
| 15 | 1,3-butanediol | Carbitol. |
| 16 | 1,3-butanediol | Butanol and allyl alcohol. |
| 17 | 1,3-butanediol | Cyclohexanol. |
| 18 | Pentaerythritol | Butanol. |

*Example 19*

A suitable reactor is charged with 6870 grams (240 moles) of diisohexyl fumarate, 1081 grams (12.0 moles) of 1,3-butanediol and 34 grams of calcium hydroxide. The mixture is heated at a reduced pressure of 10 to 50 mm. Hg. Isohexanol is distilled off until the reaction mixture attains a temperature of about 140° C. Approximately 8 hours are required for the isohexanol removal. The reaction mixture is maintained at 140° C. under reduced pressure for an additional hour and then cooled to 90° C. The catalyst is removed from the reaction mixture by filtration. The filtrate is steamed for about an hour at 100° C. and 100 mm. Hg to remove residual isohexanol. The batch is washed several times with aqueous sodium carbonate and water, steam sparged under vacuum and dried. The yield of fumarate ester composition is 6818 grams (94.4% of theory).

*Examples 20–30*

Following the procedure of Example 19 other fumarate ester compositions are prepared from the reactants as summarized below:

| Example No. | Dialkyl Fumarate | Polyhydroxol Compound |
|---|---|---|
| 20 | Isobutyl | 1,3-butanediol. |
| 21 | 2-ethylhexyl | Do. |
| 22 | Benzyl | Do. |
| 23 | Butyl | Dipropylene Glycol. |
| 24 | 2-ethylhexyl | Do. |
| 25 | Butyl | Diethylene Glycol. |
| 26 | Isobutyl | Do. |
| 27 | Butyl | Triethylene Glycol. |
| 28 | Isobutyl | Do. |
| 29 | 2-ethylhexyl | Do. |
| 30 | Butyl | 1,2,6-hexanetriol. |

*Example 31*

As suitable reactor is charged with 1575.7 grams (6.9 moles) of dibutyl fumarate and 7.8 grams of calcium hydroxide and heated to about 140° C. under a reduced pressure of about 10–12 mm. Hg. 207.0 grams (2.3 moles) of 1,3-butanediol is added slowly over a period of about 4 hours while the reaction temperature is maintained at 140° C. Upon completion of the addition of the glycol, the reaction mixture is held at 140° C. for an additional 1 hour to remove excess butanol. The reaction mixture is then cooled to 75° C. and filtered to remove the catalyst. The filtrate is steam sparged for about 1 hour at 100° C. and 100 mm. Hg, then washed several times with aqueous sodium carbonate and water, and dried under vacuum. The dry mixture is distilled at 80° C. and 10μ to remove excess dibutyl fumarate. There is obtained 701 grams (99.2% of theory) of fumarate ester composition.

*Examples 32–37*

Following the procedure of Example 31 other fumarate ester compositions are prepared from the reactants tabulated below:

| Example No. | Dialkyl Fumarate | Polyhydroxy Compound |
|---|---|---|
| 32 | Isobutyl | 1,3-butanediol. |
| 33 | Isohexyl | Do. |
| 34 | 2-ethylhexyl | Do. |
| 35 | Butyl | Triethylene Glycol. |
| 36 | ----do---- | 1,2,6-hexanetriol. |
| 37 | Cyclohexyl | 1,3-butanediol. |

*Example 38*

A suitable reactor is charged with 212.7 grams (1.12 moles) of butyl fumaryl chloride and heated to 75° C. 50.3 grams (0.56 mole) of 1,3-butanediol is added slowly to the butyl fumaryl chloride under reduced pressure of 55 mm. Hg. over a period of about ½ hour. During the 1,3-butanediol addition, the temperature of the reaction mixture is maintained at 75°–77° C. Upon completion of the addition of the 1,3-butanediol, the reaction mixture is held at 75° C. for about 1½ hours. The reaction mixture is washed several times with aqueous sodium carbonate and water, steam sparged under vacuum and dehydrated. There is obtained 192.1 grams (86.5% of theory) of fumarate ester composition, $n_d^{25}$, 1.4650, and having a specific gravity of 1.0786 at 25°/25° C.

*Examples 39–50*

In a manner similar to the procedure of Example 38 other fumarate ester compositions are prepared from the reactants listed in the following table:

| Example No. | Alkyl Fumaryl Chloride | Polyhydroxy Compound |
|---|---|---|
| 39 | Isohexyl | 1,3-butanediol. |
| 40 | 2-ethyhexyl | Do. |
| 41 | Isodecyl | Do. |
| 42 | Butyl | Dipropylene Glycol. |
| 43 | Isohexyl | Do. |
| 44 | 2-ethylhexyl | Do. |
| 45 | Butyl | Triethylene Glycol. |
| 46 | Isohexyl | Do. |
| 47 | 2-ethylhexyl | Do. |
| 48 | Butyl | 1,2,6-hexanetriol. |
| 49 | Isohexyl | Do. |
| 50 | Butyl | Pentaerythritol. |

The halogen-containing resins of this invention are those derived from such vinyl compounds as vinyl chloride, vinylidene chloride, vinyl chloroacetate, chlorostyrene, chlorobutadienes, etc. Said resins also include the copolymers of such vinyl compounds and other ethylenically unsaturated monomers copolymerizable therewith. Illustrative are the copolymers of a vinyl halide such as vinyl chloride with such materials as vinylidene chloride; vinyl esters of carboxylic acids, e.g. vinyl acetate, vinyl propionate, vinyl butyrate, vinyl benzoate; esters of unsaturated acids, e.g. alkyl acrylates such as methyl acrylate, ethyl acrylate, propyl acrylate, butyl acrylate, allyl acrylate, and the corresponding esters of methacrylic acid; vinyl aromatic compounds, e.g. styrene, orthochlorostyrene, para-chlorostyrene, 2,5-dichlorostyrene, 2,4-dichlorostyrene, para-ethyl styrene, vinyl naphthalene, α-methyl styrene; dienes such as butadiene, chlorobutadiene; unsaturated amides such as acrylic acid amide, acrylic acid anilide; unsaturated nitriles such as acrylic acid nitrile; esters of α,β-unsaturated carboxylic acids, e.g. the methyl, ethyl, propyl, butyl, amyl, hexyl, heptyl, octyl, allyl, methallyl and phenyl esters of maleic, crotonic, itaconic and fumaric acids and the like.

It should be recognized that the halogenated resins containing halogens other than chlorine, e.g. bromine, fluorine and iodine, are also operable in this invention. Said halogenated resins may contain a varying proportion of halogen depending upon the nature of the resin and its contemplated use. Those copolymers in which a predominant portion, i.e., more than 50% by weight of the copolymer is made from a halogen-containing vinyl compound such as vinyl chloride represents a preferred class of polymers to be treated according to this invention.

The above halogen-containing vinyl resins are of the dispersion type and their preparation are well known in the art. They are usually prepared by a conventional aqueous emulsion polymerization which produces a latex-like dispersion of the halogen-containing resin. The polymeric material is recovered from the latex-like dispersion by a coagulation or flocculation process as a fine powder wherein usually 95% of the particles are within ±0.05 micron of the mean particle size. Halogen-containing dispersion type resins having a wide range of average particle size, as for example, from about 0.05 to about 200 microns, may be employed in practicing this invention. However the use of powdery halogen-containing resins having an average particle size of from 0.05 to about 30 microns is preferred. Powdery dispersion type resins having a particle size less than 0.05 micron tend to dissolve too readily in the plasticizer and cause the plastisol to gel. Powdery dispersion resins having an average particle size greater than about 30 microns may tend to form grainy plastisols.

The polymerizable plasticizers of this invention are not only compatible with the various vinyl resins of the type hereindescribed but are also compatible with the known non-polymerizable ester plasticizers commonly employed with such resins. Illustrative of these latter plasticizers are the aryl and alkyl phosphates, the alkyl phthalates, adipates, sebacates, azelates, and epoxidized vegetable oils. Specifically, there can be mentioned tri-(2-ethylhexyl) phosphate, tricresyl phosphate, di(2-ethylhexyl) phthalate and the corresponding adipate, dioctyl sebacate, and epoxidized soya bean oils. Excellent plastisols have been made by intimately mixing a vinyl resin such as a polyvinyl chloride with up to 33% or more of a mixture of plasticizers, based upon the weight of the plastisol, of which one of the plasticizers is a polymerizable compound of this invention and is present in an amount equal to at least about 65% by weight of the total plasticizer.

The invention will be more fully understood by reference to the following examples. These examples, however, are given for the purpose of illustration only and are not to be construed as limiting the scope of the present invention in any way.

Resinous compositions are prepared by stirring together in weight proportions set forth below a dispersion type halogen-containing resin and a fumarate ester composition.

TABLE I

| Composition | Parts by Weight | | | | | | | | | |
|---|---|---|---|---|---|---|---|---|---|---|
| | A | B | C | D | E | F | G | H | I | J |
| Polyvinyl Chloride | 100 | 100 | 100 | 100 | 100 | 100 | 100 | 100 | 100 | 100 |
| Fumarate Ester Composition Prepared in Example 1 | 50 | 60 | | | | | | | | |
| Fumarate Ester Composition Prepared in Example 2 | | | 60 | | | | | | | |
| Fumarate Ester Composition Prepared in Example 3 | | | | 60 | | | | | | |
| Fumarate Ester Composition Prepared in Example 5 | | | | | 60 | | | | | |
| Fumarate Ester Composition Prepared in Example 8 | | | | | | 60 | | | | |
| Fumarate Ester Composition Prepared in Example 15 | | | | | | | 60 | | | |
| Fumarate Ester Composition Prepared in Example 19 | | | | | | | | 60 | | |
| Fumarate Ester Composition Prepared in Example 31 | | | | | | | | | 60 | |
| Fumarate Ester Composition Prepared in Example 38 | | | | | | | | | | 60 |
| Diabasic Lead Phosphite | 3 | 3 | 3 | 3 | 3 | 3 | 3 | 3 | 3 | 3 |
| t-Butyl Perbenzoate | 0.5 | 0.6 | 0.6 | 0.6 | 0.6 | 0.6 | 0.6 | 0.6 | 0.6 | 0.6 |

The viscosity of the above compositions at 25° C. was tested on the Brookfield Model HAT viscometer using a No. 4 spindle at 12 r.p.m. The results of such testing, in poises, is hereinafter recorded.

TABLE II

| Composition | A | B | C | D | E | F | G | H | I | J |
|---|---|---|---|---|---|---|---|---|---|---|
| Viscosity, poises, 1 Day at 25° C | 318 | 141 | 1,490 | 1,040 | 1,050 | 2,700 | 980 | 7,800 | 5,200 | 16,540 |

To further illustrate the unique properties imparted by the plasticizers of this invention, the resinous compositions set forth in Table I were pressure molded for 8 minutes at 325° F. The finished products are characterized by the physical properties listed below.

TABLE III

| Composition | A | B | C | D | E | F | G | H | I | J |
|---|---|---|---|---|---|---|---|---|---|---|
| Volatility, Percent Weight Loss | 2.00 | 2.23 | 0.36 | 5.00 | 1.33 | 1.74 | 1.77 | 4.11 | 7.30 | 0.67 |
| Hardness, Shore "D" Units | 71 | 70 | 79 | 52 | 65 | 71 | 65 | 55 | 35 | 70 |
| Tensile Strength, p.s.i | 2,800 | 2,940 | 4,810 | 2,480 | 2,140 | 2,710 | 2,020 | 2,580 | 2,150 | 3,100 |
| Percent Elongation | 35 | 100 | 20 | 210 | 38 | 28 | 22 | 230 | 410 | 120 |
| Toughness, lbs./in.$^2$ | | 1,216 | 258 | 1,570 | 300 | 289 | 179 | 2,095 | 2,480 | 1,585 |

The following test methods are used in determining the physical properties listed in Table III.

Volatility _____ A.S.T.M. D-1203.
Tensile properties _____ A.S.T.M. D-882-56T.
Hardness _____ A.S.T.M. D-676-58T.

At room temperature the molded Compositions C, D, E, F, G and J were hard and rigid. Compositions A, B, H and I were hard and semi-rigid. All of said compositions are characterized by a tack-free surface.

Results similar to those obtained with Compositions A through J of Table I are obtained when other fumarate ester compositions are employed in preparing the resinous compositions. Such compositions include the fumarate ester compositions prepared in Examples 4 through 18, 20 through 30, 32 through 37 and 39 through 50.

While this invention has been described with respect to certain embodiments, it is not so limited and it is to be understood that variations and modifications thereof may be made without departing from the spirit or scope of this invention.

The embodiments of the invention in which an exclusive property or privilege is claimed are defined as follows:

1. A vinyl halide resin composition comprising a polymer of vinyl halide selected from the group consisting of homopolymers of vinyl halide and copolymers of vinyl halide containing at least 50% vinyl halide and up to 50% of an ethylenically unsaturated monomer copolymerizable therewith and the reaction product of a fumaryl chloride of the formula

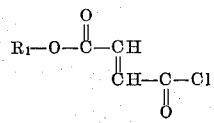

where $R_1$ is selected from the group consisting of alkyl, cycloalkyl, alkenyl, and aralkyl radicals, with a polyhydroxy compound having from 2 to 6 hydroxyl groups, the molar ratio of chloride to polyhydroxy compound being $x:1$ where $x$ equals the number of said hydroxyl groups, said reaction product being present in the amounts of from 5 to about 200 parts by weight per 100 parts by weight of vinyl halide polymer.

2. A vinyl chloride resin composition comprising a vinyl chloride polymer selected from the group consisting of polymerized vinyl chloride monomers and the copolymers of such monomers with an ethylenically unsaturated monomer, at least 50% of the monomer units of said copolymers being vinyl chloride units and the reaction product of a fumaryl chloride of the formula

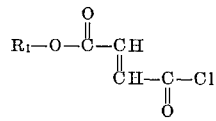

where $R_1$ is selected from the group consisting of alkyl, cycloalkyl, alkenyl and aralkyl radicals, with a polyhydroxy compound having from 2 to 6 hydroxyl groups, the molar ratio of chloride to polyhydroxy compound being $x:1$ where $x$ equals the number of said hydroxyl groups; said reaction product being present in the amounts of from about 5 to about 200 parts by weight per 100 parts by weight of vinyl chloride polymer.

3. A composition of claim 2 wherein the vinyl chloride polymer is a vinyl chloride-vinyl acetate copolymer.

4. A polyvinyl chloride resin composition comprising polyvinyl chloride and the reaction product of a fumaryl chloride of the formula

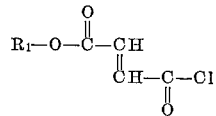

where $R_1$ is selected from the group consisting of alkyl, cycloalkyl, alkenyl and aralkyl radicals, with a polyhydroxy compound having from 2 to 6 hydroxyl groups, the molar ratio of chloride to polyhydroxy compound being $x:1$ where $x$ equals the number of said hydroxyl groups; said reaction product being present in amounts of from about 5 to about 200 parts by weight per 100 parts by weight of polyvinyl chloride.

5. A polyvinyl chloride resin composition comprising polyvinyl chloride and the reaction product of butyl fumaryl chloride and 1,2,6-hexanetriol, said reaction product being present in amounts of from 5 to 200 parts by weight per 100 parts by weight of polyvinyl chloride.

6. A polyvinyl chloride resin composition comprising polyvinyl chloride and the reaction product of isohexyl fumaryl chloride and 1,3-butanediol, said reaction product being present in amounts of from 5 to 200 parts by weight of polyvinyl chloride.

References Cited by the Examiner
UNITED STATES PATENTS

| | | | |
|---|---|---|---|
| 1,923,938 | 8/1933 | Kyrides | 260—485 |
| 2,251,765 | 8/1941 | Sorenson | 260—485 |
| 2,295,513 | 9/1942 | Bradley | 260—485 |
| 2,341,846 | 2/1944 | Meincke | 260—485 |
| 2,415,366 | 2/1947 | Muskat | 260—485 |
| 2,647,098 | 7/1953 | Smith et al. | 260—31.6 |
| 2,697,087 | 12/1954 | Hetzel | 260—31.6 |
| 2,744,877 | 5/1956 | Smith | 260—31.6 |
| 2,757,157 | 7/1956 | Hetzel | 260—31.6 |
| 2,759,967 | 8/1956 | Cash et al. | 260—485 |
| 2,764,609 | 9/1956 | Gamrath | 260—485 |
| 2,766,273 | 10/1956 | Bruins et al. | 260—484 |
| 2,909,499 | 10/1959 | Hoaglin et al. | 260—31.8 |
| 3,067,178 | 12/1962 | Greenberg et al. | 260—485 |
| 3,113,125 | 12/1963 | Grantham et al. | 260—485 |

MORRIS LIEBMAN, *Primary Examiner.*

LEON J. BERCOVITZ, LESLIE H. GASTON,
*Examiners.*

J. A. KOLASCH, L. T. JACOBS, *Assistant Examiners.*

UNITED STATES PATENT OFFICE
CERTIFICATE OF CORRECTION

Patent No. 3,280,067                            October 18, 1966

Constantine E. Anagnostopoulos

It is hereby certified that error appears in the above numbered patent requiring correction and that the said Letters Patent should read as corrected below.

Column 2, line 46, for "adiphatic" read -- aliphatic --; column 12, line 13, after "weight" insert -- per 100 parts by weight --.

Signed and sealed this 24th day of October 1967.

(SEAL)
Attest:

Edward M. Fletcher, Jr.                          EDWARD J. BRENNER
Attesting Officer                               Commissioner of Patents